(12) United States Patent
Miyasaka et al.

(10) Patent No.: US 10,602,272 B2
(45) Date of Patent: Mar. 24, 2020

(54) AUDIO SIGNAL PROCESSOR

(71) Applicant: SOCIONEXT INC., Kanagawa (JP)

(72) Inventors: Shuji Miyasaka, Yokohama (JP); Kazutaka Abe, Yokohama (JP)

(73) Assignee: Socionext Inc., Kanagawa (JP)

( * ) Notice: Subject to any disclaimer, the term of this patent is extended or adjusted under 35 U.S.C. 154(b) by 0 days.

(21) Appl. No.: 16/289,949

(22) Filed: Mar. 1, 2019

(65) Prior Publication Data

US 2019/0200131 A1 Jun. 27, 2019

Related U.S. Application Data

(63) Continuation of application No. PCT/JP2017/023144, filed on Jun. 23, 2017.

(30) Foreign Application Priority Data

Sep. 8, 2016 (JP) .................................. 2016-175977

(51) Int. Cl.
| | |
|---|---|
| *H04R 3/12* | (2006.01) |
| *B60Q 5/00* | (2006.01) |
| *G08G 1/16* | (2006.01) |
| *H04S 3/00* | (2006.01) |
| *B60R 11/02* | (2006.01) |
| *G08G 1/0967* | (2006.01) |
| *H04S 7/00* | (2006.01) |

(52) U.S. Cl.
CPC ................ *H04R 3/12* (2013.01); *B60Q 5/00* (2013.01); *B60R 11/02* (2013.01); *G08G 1/0967* (2013.01); *G08G 1/166* (2013.01); *H04S 3/008* (2013.01); *H04S 7/30* (2013.01); *H04R 2499/13* (2013.01); *H04S 2400/01* (2013.01); *H04S 2400/13* (2013.01)

(58) Field of Classification Search
None
See application file for complete search history.

(56) References Cited

U.S. PATENT DOCUMENTS

| | | | |
|---|---|---|---|
| 2003/0021433 A1* | 1/2003 | Lee ......................... | H04R 5/02 381/302 |
| 2012/0114143 A1* | 5/2012 | Waragaya ............... | H04S 1/007 381/98 |
| 2017/0353812 A1* | 12/2017 | Schaefer ................ | H04S 7/303 |

FOREIGN PATENT DOCUMENTS

| | | |
|---|---|---|
| JP | 2005-167975 A | 6/2005 |
| JP | 2006-222686 A | 8/2006 |
| JP | 2006-295443 A | 10/2006 |

(Continued)

OTHER PUBLICATIONS

International Search Report issued in Application No. PCT/JP2017/023144 dated Sep. 5, 2017, with English translation.

*Primary Examiner* — Paul W Huber
(74) *Attorney, Agent, or Firm* — McDermott Will & Emery LLP

(57) ABSTRACT

An audio signal processor includes: a first amplifier that amplifies a first audio content; a mixer that mixes an output signal of the first amplifier and a second audio content; a second amplifier that amplifies an output signal of the mixer; and a setter that sets an amplification amount of the first amplifier. The setter sets an amplification amount in the first amplifier so that the amplification amount in the first amplifier cancels an amplification amount in the second amplifier.

3 Claims, 6 Drawing Sheets

(56) References Cited

FOREIGN PATENT DOCUMENTS

| JP | 2007-019980 A | 1/2007 |
| JP | 2010-034755 A | 2/2010 |

* cited by examiner ial Application No. PCT/JP2017/023144 filed on Jun. 23, 2017, designating the United States of America, which is based on and claims priority of Japanese Patent Application No. 2016-175977 filed on Sep. 8, 2016. The entire disclosures of the above-identified applications, including the specifications, drawings and claims are incorporated herein by reference in their entirety.

AUDIO SIGNAL PROCESSOR

CROSS REFERENCE TO RELATED APPLICATIONS

This is a continuation application of PCT International Application No. PCT/JP2017/023144 filed on Jun. 23, 2017, designating the United States of America, which is based on and claims priority of Japanese Patent Application No. 2016-175977 filed on Sep. 8, 2016. The entire disclosures of the above-identified applications, including the specifications, drawings and claims are incorporated herein by reference in their entirety.

FIELD

The present disclosure relates to an audio signal processor that processes multiple audio contents.

BACKGROUND

In recent years, due to advancement of advanced driving assistant system (ADAS) technology, the presence of a hazardous object, such as a pedestrian and a motorcycle, which has to be avoided by the driver of a vehicle with attention can be automatically detected, and the presence can be also conveyed to the driver by a voice message. In this case, the driver is further alerted that attention be paid for a hazardous object when a message for calling attention is heard from a direction in which the hazardous object is present. For example, when a hazardous object is on the right side of the driver, warning should be heard near the right ear of the driver. FIG. 6 is an illustration showing the manner in which a message for effectively calling attention is conveyed to a driver 61 in a vehicle 50. As illustrated in FIG. 6, for example, when a motorcycle on the right side of the vehicle 50 is approaching the driver 61 driving at a driver seat 51 of the vehicle 50, a voice message of "a motorcycle is approaching from the right" should be generated near the right ear of the driver 61. For example, when the vehicle 50 is crossing the left lane marker, a voice message of "the vehicle is crossing the left lane marker" should be generated near the left ear of the driver 61. In order to generate a voice message near the right and left ears of the driver 61 in this manner, it is sufficient to process an audio signal as needed, which is to be inputted to each of a left channel (left-side) speaker device 88 and a right channel (right-side) speaker device 89 provided in the vehicle 50.

In recent years, self-driving technology has been developed, and it is said that many of drive operation works can be automatically performed. However, it is expected that implementation of complete self-driving driving takes time, and assisting the driving operation of a driver using voice guidance and warning sound is considered to be continued.

When such voice guidance and warning sound overlaps with the sound from an audio device, and is hard to hear, which interferes with the driving operation. Thus, for example, the method shown in Patent Literature 1 is proposed as a method of controlling a sound field by adjusting sound field characteristics and an output sound volume so that the voice guidance and warning sound can be heard rather than the sound from audio equipment.

CITATION LIST

Patent Literature

Patent Literature 1
Japanese Unexamined Patent Application Publication No. 2005-167975

SUMMARY

Technical Problem

However, with the method shown in Patent Literature 1, a user may be change the amplification ratio between the right and left in an amplifier that outputs audio according to the user's preference or the presence of an occupant in a vehicle. In this case, there is a problem in that the audio guidance and the warning sound, which are especially important to the driver, may be affected and the effect may be reduced.

The present disclosure has been made in consideration of such an existing problem, and aims to provide an audio signal processor that protects against reduction in the effect of an audio content which is processed so that the driver seat of a vehicle becomes a sweet spot, and that can freely set the amplification ratio between the right and the left for another audio content.

Solution to Problem

In order to solve the above-mentioned problem, an aspect of the present disclosure provides an audio signal processor that processes a first audio content including a first left channel signal and a first right channel signal, and a second audio content, the first audio content being processed so that when the first audio content is reproduced in a vehicle by a left channel speaker device and a right channel speaker device, a driver seat of the vehicle becomes a sweet spot, the audio signal processor including: a first amplifier that receives an input of the first left channel signal and the first right channel signal, and outputs a first left channel amplified signal generated by amplifying the first left channel signal by a first left channel amplification amount, and a first right channel amplified signal generated by amplifying the first right channel signal by a first right channel amplification amount; a mixer that outputs a left channel mixed signal and a right channel mixed signal which are obtained by mixing the first left channel amplified signal and the first right channel amplified signal with the second audio content; a second amplifier that receives an input of the left channel mixed signal and the right channel mixed signal, and outputs a left channel output signal generated by amplifying the left channel mixed signal by a second left channel amplification amount, and a right channel output signal generated by amplifying the right channel mixed signal by a second right channel amplification amount; and a setter that sets the first left channel amplification amount and the first right channel amplification amount. The setter sets the first left channel amplification amount so that the first left channel amplification amount and the second left channel amplification amount are cancelled out by each other, and sets the first right channel amplification amount so that the first right channel amplification amount and the second right channel amplification amount are cancelled out by each other.

Consequently, an amplification amount for a signal included in the first audio content is cancelled out by the first amplifier and the second amplifier. In contrast, an amplification amount for the second audio content can be freely set by the setter. Therefore, for example, when the audio signal processor is installed in a vehicle, and a signal representing voice guidance, warning sound or the like for assisting, for example, driving operation of the vehicle is used as the first audio content, it is possible to protect against reduction in the effect of the first audio content, and to freely set the amplification ratio between the right and the left for the second audio content.

In the audio signal processor according to an aspect of the present disclosure, the second audio content may include the second left channel signal and the second right channel signal, the left channel mixed signal may be a signal obtained by mixing the first left channel amplified signal and the second left channel signal, and the right channel mixed signal may be a signal obtained by mixing the first right channel amplified signal and the second right channel signal.

Thus, the first left channel signal amplified by the first left channel amplification amount in the first amplifier is mixed in the mixer, then is amplified by the second left channel amplification amount in the second amplifier. Here, the setter sets the first left channel amplification amount so that the first left channel amplification amount and the second left channel amplification amount are cancelled out by each other, thus change in the strength of the first left channel signal in the audio signal processor is reduced. Similarly, change in the strength of the first right channel signal in the audio signal processor is also reduced. Therefore, for example, when the audio signal processor is installed in a vehicle, and a signal representing voice guidance, warning sound or the like for assisting, for example, driving operation of the vehicle is used as the first audio content, it is possible to protect against reduction in the effect of the first audio content more reliably.

The audio signal processor according to an aspect of the present disclosure may further includes: a left channel speaker device that outputs the left channel output signal, and a right channel speaker device that outputs the right channel output signal. The setter may set the second left channel amplification amount and the second right channel amplification amount based on the position of a listener of the second audio content.

Consequently, the ratio of the amplification amounts for the right and left signals of the second audio content can be freely set according to the position of a listener of the second audio content. In this case also, it is possible to protect against reduction in the effect of the first audio content.

In order to solve the above-mentioned problem, an aspect of the present disclosure provides an audio signal processor that processes a first audio content including a first left channel signal and a first right channel signal, a second audio content, and a third audio content, the first audio content being processed so that when the first audio content is reproduced in a vehicle by a left channel speaker device and a right channel speaker device, a driver seat of the vehicle becomes a sweet spot, the audio signal processor including: a first mixer that outputs a first left channel mixed signal and a first right channel mixed signal which are obtained by mixing the second audio content and the third audio content; an amplifier that receives an input of the first left channel mixed signal and the first right channel mixed signal, and outputs a left channel amplified signal generated by amplifying the first left channel mixed signal by a left channel amplification amount, and a right channel amplified signal generated by amplifying the first right channel mixed signal by a right channel amplification amount; a second mixer that receives an input of the left channel amplified signal, the right channel amplified signal, and the first audio content, and outputs a left channel output signal obtained by mixing the left channel amplified signal and the first left channel signal, and a right channel output signal obtained by mixing the right channel amplified signal and the first right channel signal; and a setter that sets the left channel amplification amount and the right channel amplification amount.

In this manner, each signal included in the first audio content in the audio signal processor is not substantially amplified (and attenuated). In contrast, an amplification amount for the second and third audio contents can be freely set by the setter. Therefore, when an audio signal is used as the first audio content, which represents, for example, voice guidance, warning sound for assisting driving operation of the vehicle, it is possible to protect against reduction in the effect of the first audio content and to freely set the amplification ratio between the right and the left for the second and third audio contents.

The audio signal processor according to an aspect of the present disclosure may further includes: a left channel speaker device that outputs the left channel output signal, and a right channel speaker device that outputs the right channel output signal. The setter may set the left channel amplification amount and the right channel amplification amount based on the position of a listener of the second audio content and the third audio content.

Consequently, the ratio of the amplification amounts for the right and left signals of the second audio content can be freely set according to the position of a listener of the second and third audio contents. In this case also, it is possible to protect against reduction in the effect of the first audio content.

In order to solve the above-mentioned problem, an aspect of the present disclosure provides an audio signal processor that processes a first audio content including a first left channel signal and a first right channel signal, and a second audio content including a second left channel signal and a second right channel signal, the audio signal processor including: a first amplifier that receives an input of the first left channel signal and the first right channel signal, and outputs a first left channel amplified signal generated by amplifying the first left channel signal by a first left channel amplification amount, and a first right channel amplified signal generated by amplifying the first right channel signal by a first right channel amplification amount; a second amplifier that receives an input of the second left channel signal and the second right channel signal, and outputs a second left channel amplified signal generated by amplifying the second left channel signal by a second left channel amplification amount, and a second right channel amplified signal generated by amplifying the second right channel signal by a second right channel amplification amount; a mixer that outputs a left channel output signal obtained by mixing the first left channel amplified signal and the second left channel amplified signal, a right channel output signal obtained by mixing the first right channel amplified signal and the second right channel amplified signal; and a setter that sets the first left channel amplification amount and the first right channel amplification amount, and the second left channel amplification amount and the second right channel amplification amount. The setter sets the first left channel amplification amount to a value smaller than the second left channel amplification amount, and sets the first right channel amplification amount to a value smaller than the second right channel amplification amount.

Like this, the amplification amount for the signal included in the first audio content is smaller than the amplification amount for the signal included in the second audio content. Therefore, for example, when the audio signal processor is installed in a vehicle, and a signal representing voice guidance, warning sound or the like for assisting, for example, driving operation of the vehicle is used as the first audio content, it is possible to protect against reduction in the effect of the first audio content, and to freely set the amplification amount for the signal included in the second audio content.

Advantageous Effects

According to the present disclosure, it is possible to provide an audio signal processor that protects against reduction in the effect of an audio content which is processed so that the driver seat of a vehicle becomes a sweet spot, and that can freely set the amplification ratio between the right and the left for another audio content.

BRIEF DESCRIPTION OF DRAWINGS

These and other objects, advantages and features of the invention will become apparent from the following description thereof taken in conjunction with the accompanying drawings that illustrate a specific embodiment of the present invention.

DESCRIPTION OF EMBODIMENTS

Hereinafter, an embodiment will be described in detail with reference to the drawings as needed. However, a description more than necessary may be omitted. For example, a detailed description of a matter already known well and a redundant description of substantially the same configuration may be omitted. This is for the purpose of avoiding unnecessarily redundant description below and facilitating the understanding of those skilled in the art.

The inventors provide the accompanying drawings and the description below so that those skilled in the art sufficiently understand the present disclosure, and do not intend to limit the scope stated in CLAIMS.

Embodiment 1

[1-1. Entire Configuration]
An audio signal processor according to Embodiment 1 will be described. In the embodiment, audio content such as music recorded, for example, on a compact disc (CD) is provided to an occupant on a front passenger seat with a favorable sound volume balance as well as an audio content such as warning sound for calling attention is provided near an ear of the driver. Hereinafter, the audio signal processor according to the embodiment will be described with reference to the drawings.

Figure 1:
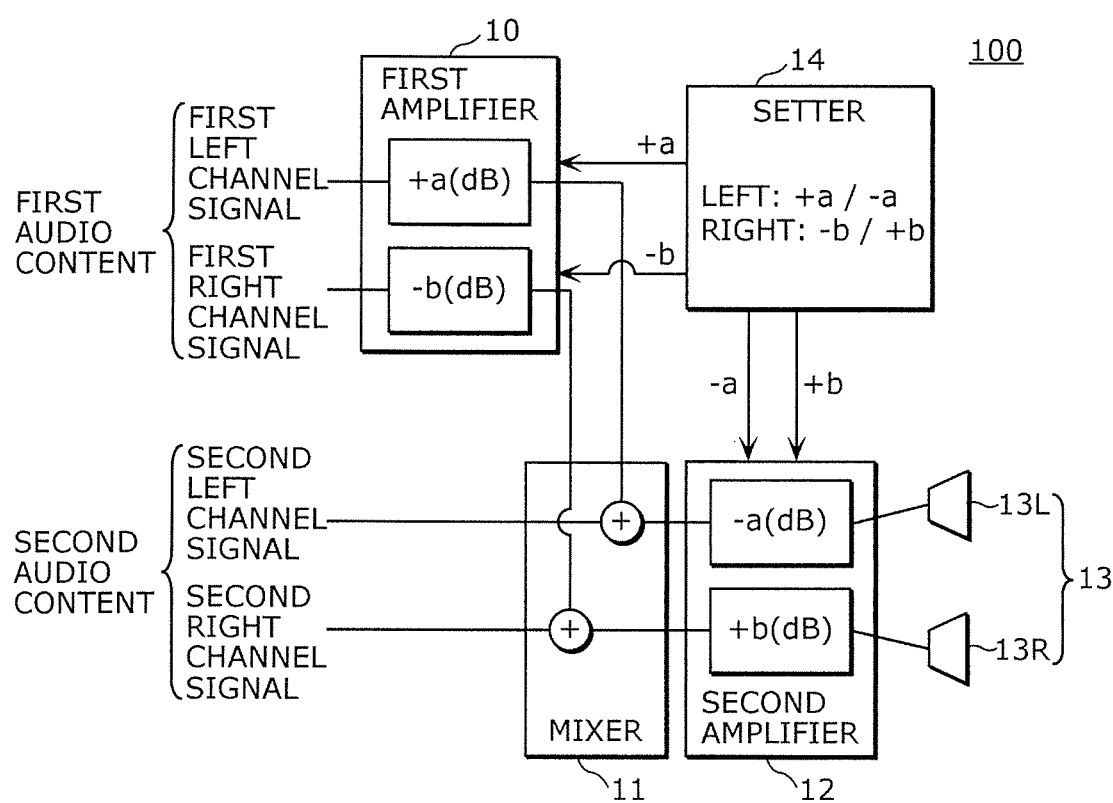
FIG. 1 is a block diagram illustrating the schematic configuration of an audio signal processor according to Embodiment 1.

FIG. 1 is a block diagram illustrating the schematic configuration of an audio signal processor 100 according to the embodiment.

The audio signal processor 100 is a device that processes a first audio content and a second audio content. The audio signal processor 100 is used in a vehicle such as an automobile, for example.

The first audio content is an audio content that includes a first left channel signal and a first right channel signal, and that is processed so that when the audio content is reproduced by a speaker 13 including a left channel (left-side) speaker device 13L and a right channel (right-side) speaker device 13R in a vehicle, the driver seat of the vehicle becomes a sweet spot. The first audio content is, for example, an audio content, such as voice guidance, warning sound, for assisting the driving operation of a driver. The sweet spot refers to a position or an area of a listener, where the audio content is heard without its effect being reduced. The sweet spot is determined by a position relative to the position of a speaker that outputs an audio content. The first audio content is pre-processed so that when reproduced by 2ch speaker 13 including the left channel speaker device 13L and the right channel speaker device 13R installed in a vehicle, voice guidance or warning sound is generated near an ear of the driver.

The second audio content is not be particularly limited as long as it is an audio content. The second audio content is an audio content such as music recorded, for example, on a CD. In the embodiment, the second audio content includes a second left channel signal and a second right channel signal.

As illustrated in FIG. 1, the audio signal processor 100 according to the embodiment includes a first amplifier 10, a mixer 11, a second amplifier 12, and a setter 14. In the embodiment, the audio signal processor 100 further includes the speaker 13 including the left channel speaker device 13L and the right channel speaker device 13R.

The first amplifier 10 is an audio amplifier that receives an input of a first left channel signal and a first right channel signal of the first audio content, and outputs a first left channel amplified signal generated by amplifying the first left channel signal by a first left channel amplification amount, and a first right channel amplified signal generated by amplifying the first right channel signal by a first right channel amplification amount. The first amplifier 10 independently amplifies the first left channel signal and the first right channel signal of the first audio content.

The mixer 11 is an audio mixer that outputs a left channel mixed signal and a right channel mixed signal which are obtained by mixing the first left channel amplified signal and the first right channel amplified signal with the second audio content. In the embodiment, the left channel mixed signal is a signal obtained by mixing the first left channel amplified signal outputted from the first amplifier 10 and the second left channel signal of the second audio content. The right channel mixed signal is a signal obtained by mixing the first right channel amplified signal outputted from the first amplifier 10 and the second right channel signal of the second audio content.

The second amplifier 12 is an audio amplifier that receives an input of the left channel mixed signal and the right channel mixed signal which are outputted from the mixer 11, and outputs a left channel output signal generated by amplifying the left channel mixed signal by a second left channel amplification amount, and a right channel output signal generated by amplifying the right channel mixed signal by a second right channel amplification amount. The second amplifier 12 independently amplifies the left channel mixed signal and the right channel mixed signal which are output signals of the mixer 11.

The speaker 13 includes 2ch speakers on the left channel and the right channel connected to the second amplifier 12. The speaker 13 includes a left channel speaker device 13L and a right channel speaker device 13R. The left channel speaker device 13L and the right channel speaker device 13R receives an input of a left channel output signal and a right channel output signal which are outputted from the second amplifier 12. For example, the left channel speaker device 13L and the right channel speaker device 13R are installed at positions on the left side and the right side as viewed from the driver seat of a vehicle such as an automobile.

The setter 14 is a processor that sets the first left channel amplification amount and the first right channel amplification amount. The setter 14 sets the first left channel amplification amount so that the first left channel amplification amount and the second left channel amplification amount are cancelled out by each other, and sets the first right channel amplification amount so that the first right channel amplification amount and the second right channel amplification amount are cancelled out by each other. In the embodiment, the setter 14 sets the second left channel amplification amount and the second right channel amplification amount in the second amplifier 12 so that the balance between the sound volumes outputted from the left channel speaker device 13L and the right channel speaker device 13R becomes an optimal at the position of a listener. The setting by the setter 14 of the second left channel amplification amount and the second right channel amplification amount may be manually performed by a user (for example, a listener), or may be automatically performed by the setter 14. For example, the setter 14 may detect the position of a listener by a human sensor, and may automatically set the second left channel amplification amount and the second right channel amplification amount based on the position and the position of the speaker 13.

The setter 14 sets a first left channel amplification amount and a first right channel amplification amount based on the second left channel amplification amount and the second right channel amplification amount set in this manner. Specifically, the setter 14 may set a first left channel amplification amount and a first right channel amplification amount so that the sum of the second left channel amplification amount (dB) and the first left channel amplification amount (dB), and the sum of the second right channel amplification amount (dB) and the first right channel amplification amount (dB) are lower than or equal to a predetermined threshold. The predetermined threshold may be determined as needed so that the effect of the first audio content on the driver is not reduced in the audio signal processor 100.

[1-2. First Audio Content]

Subsequently, the processing performed on the first audio content according to the embodiment will be described with reference to the drawings.

Figure 2:
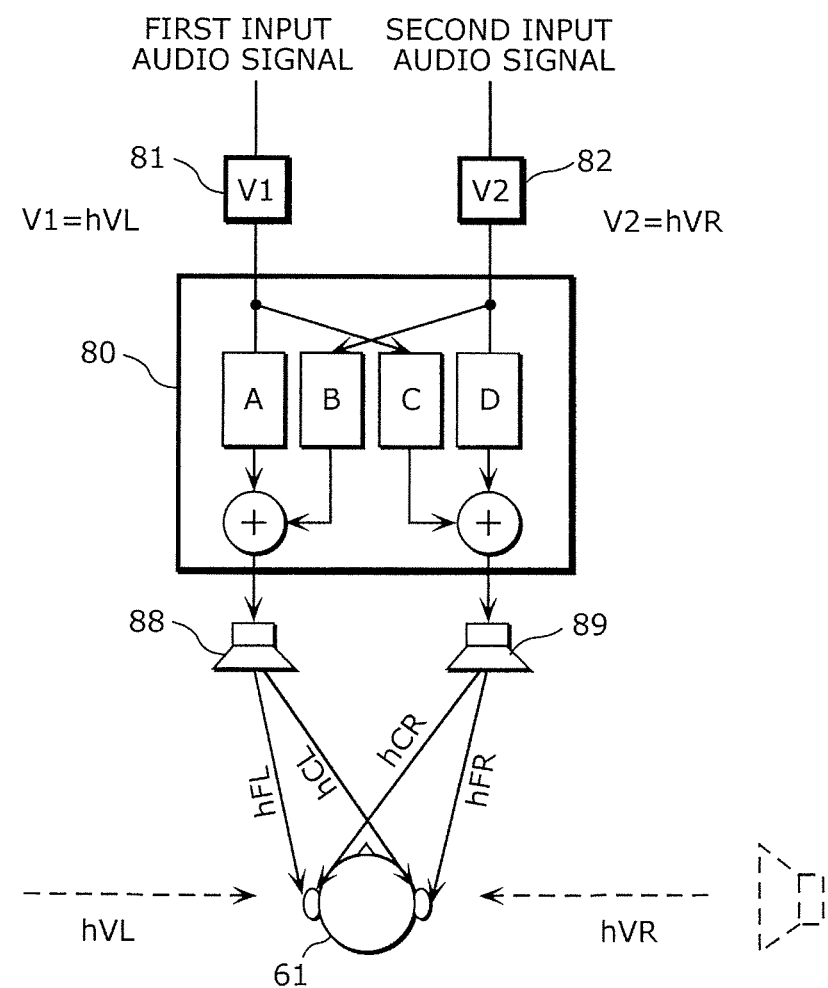
FIG. 2 is a block diagram illustrating an overview of processing performed on a first audio content according to Embodiment 1.

FIG. 2 is a block diagram illustrating an overview of the processing performed on the first audio content according to the embodiment. In FIG. 2, an example of processing is shown, in which sound is generated simultaneously near the left ear and the right ear of the driver 61.

As illustrated in FIG. 2, the first audio content is generated by processing the first input audio signal and the second input audio signal using virtual sound image localization filters 81 and 82, and a crosstalk cancellation unit 80. The first input audio signal is a signal that represents sound generated near the left ear of the driver 61, and the second input audio signal is a signal that represents sound generated near the right ear of the driver 61.

The first input audio signal is processed by the virtual sound image localization filter 81. The second input audio signal is processed by the virtual sound image localization filter 82.

The virtual sound image localization filter 81 is designed so that the sound of an input audio signal inputted to the filter is heard from the left direction of the driver 61, that is, the sound of an input audio signal is localized to the left side of the driver 61. In other words, the virtual sound image localization filter 81 is designed so that the sound of an input audio signal to a predetermined position is localized, and sound is perceived in an emphasized manner at the position of the left ear of the driver 61 who faces a left channel speaker device 88 and a right channel speaker device 89. Specifically, the virtual sound image localization filter 81 is a filter that represents a transfer function (V1=hVL) of sound from a sound source placed leftward of the driver 61 to the left ear of the driver 61.

Similarly to the virtual sound image localization filter 81, the virtual sound image localization filter 82 is a filter that is designed so that the sound of an input audio signal inputted to the filter is heard from the right direction of the driver 61. Specifically, the virtual sound image localization filter 82 is a filter that represents a transfer function (V2=hVR) of sound from a sound source placed rightward of the driver 61 to the right ear of the driver 61.

The first input audio signal processed by the virtual sound image localization filter 81 is inputted to one input terminal of the crosstalk cancellation unit 80. The second input audio signal processed by the virtual sound image localization filter 82 is inputted to the other input terminal of the crosstalk cancellation unit 80.

The crosstalk cancellation unit 80 is a processor that performs on an input audio signal cancellation processing which reduces perception of the sound of an input audio signal to be perceived near one of the ears of the driver 61 near the other ear of the driver 61.

The crosstalk cancellation processing includes multiplication processing on transfer functions A, B, C, and D, addition processing on a signal multiplied by the transfer function A and a signal multiplied by the transfer function B, and addition processing on a signal multiplied by the transfer function C and a signal multiplied by the transfer function D. In other words, the crosstalk cancellation processing is processing that uses the inverse matrix of 2×2 matrix having elements of transfer functions of the sound that is outputted from the left channel speaker device 88 and the right channel speaker device 89 and reaches each ear of the driver 61. The above-mentioned transfer functions A, B, C, and D are defined based on transfer functions hFL and hCL from the left channel speaker device 88 to the left ear and the right ear of the driver 61, respectively, and transfer functions hCR and hFR from the right channel speaker device 89 to the left ear and the right ear of the driver 61, respectively.

The first left channel signal and the first right channel signal of the first audio content according to the embodiment correspond to the signals outputted from the crosstalk cancellation unit 80 to the left channel speaker device 88 and the right channel speaker device 89 illustrated in FIG. 2. Thus, it is possible to generate the first audio content that is processed so that the driver seat becomes a sweet spot.

[1-3. Operation]

Subsequently, the operation of thus configured audio signal processor 100 will be described.

First, the amplitudes of the first left channel signal and the first right channel signal of the first audio content are each independently amplified in the first amplifier unit 10. The first left channel signal and the first right channel signal amplified are outputted from the first amplifier 10 as the first left channel amplified signal and the first right channel amplified signal, respectively.

Subsequently, the first left channel amplified signal and the first right channel amplified signal, which are output signals of the first amplifier 10, are mixed with the second audio content in the mixer 11, and are outputted as the left channel mixed signal and the right channel mixed signal, respectively.

Furthermore, the left channel mixed signal and the right channel mixed signal, which are output signals of the mixer 11, are each independently amplified in the second amplifier 12. The amount of amplification is the value set by the setter 14, and the left channel mixed signal and the right channel mixed signal are each amplified so that optimal sound volume balance is achieved at the position of a listener, that is, the position of the front passenger seat of a vehicle in the embodiment. In the embodiment, it is assumed that the second left channel amplification amount is −a (dB), and the second right channel amplification amount is +b(dB). The left channel mixed signal and the right channel mixed signal amplified are outputted as the left channel output signal and the right channel output signal, respectively.

The speaker 13 is connected to the second amplifier 12 to output an audio signal amplified by the second amplifier 12.

Here, the operation when the position of a listener is moved from the driver seat to the front passenger seat will be described as an example with reference to the drawings.

Figure 3:
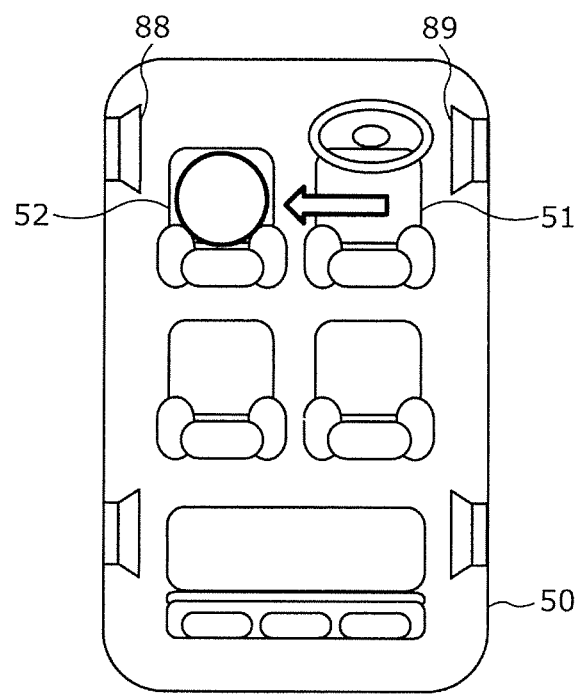
FIG. 3 is a schematic diagram illustrating the position of a listener in a vehicle including the audio signal processor according to Embodiment 1.

FIG. 3 is a schematic diagram illustrating the position of a listener in a vehicle 50 including the audio signal processor 100 according to the embodiment.

As illustrated in FIG. 3, in the vehicle 50, the front passenger seat 52 is disposed at a position nearer to the left channel speaker device 88 than the right channel speaker device 89. Thus, when the position of a listener is moved to the front passenger seat 52 of the vehicle 50, the setter 14 sets each amplification amount of the second amplifier 12 so that the sound volume from the left channel speaker device 88 is decreased, and the sound volume from the right channel speaker device 89 is increased. For example, the setter 14 sets the second left channel amplification amount and the second right channel amplification amount of the second amplifier to −a (dB) and +b (dB), respectively (where, a>0, b>0). It is to be noted that in the embodiment, as the left channel speaker device 88 and the right channel speaker device 89 installed in the vehicle 50, the left channel speaker device 13L and the right channel speaker device 13R of the audio signal processor 100 are used respectively.

The setter 14 then calculates a first left channel amplification amount and a first right channel amplification amount of the first amplifier 10 so that the second left channel amplification amount −a (dB) and the second right channel amplification amount +b (dB), which are set to the second amplifier 12, are cancelled out by each other. Then, the first left channel amplification amount +a (dB) and the first right channel amplification amount −b (dB), which are determined by the setter 14, are set to the first amplifier 10. In this manner, an amplification amount for the first audio content in the audio signal processor 100 is maintained at substantially 0 dB on the left channel and the right channel.

Consequently, the effect of the first audio content is not reduced by the audio signal processor 100, and thus voice guidance, warning sound can be generated, for example, near the ears of a driver. In the embodiment, an example has been shown, in which the setter 14 completely cancel the second left channel amplification amount and the second right channel amplification amount by the first left channel amplification amount and the first right channel amplification amount. However, the configuration of the setter 14 is not limited to this. It is sufficient that the setter 14 set the first left channel amplification amount and the first right channel amplification amount so that the effect of the first audio content on the driver 61 is not reduced.

[1-4. Summary]

As described above, the audio signal processor 100 according to the embodiment processes the first audio content and the second audio content including the first left channel signal and the first right channel signal, respectively, and when the first audio content and the second audio content are reproduced by the left channel speaker device 13L and the right channel speaker device 13R in the vehicle 50, the driver seat 51 of the vehicle 50 becomes a sweet spot. The audio signal processor 100 includes the first amplifier 10 that receives an input of the first left channel signal and the first right channel signal, and outputs the first left channel amplified signal generated by amplifying the first left channel signal by the first left channel amplification amount, and the first right channel amplified signal generated by amplifying the first right channel signal by the first right channel amplification amount. The audio signal processor 100 further includes the mixer 11 that outputs the left channel mixed signal and the right channel mixed signal obtained by mixing the first left channel amplified signal and the first right channel amplified signal with the second audio content. The audio signal processor 100 further includes the second amplifier 12 that receives an input of the left channel mixed signal and the right channel mixed signal, and outputs the left channel output signal generated by amplifying the left channel mixed signal by the second left channel amplification amount, and the right channel output signal generated by amplifying the right channel mixed signal by the second right channel amplification amount. The audio signal processor 100 further includes the setter 14 that sets the first left channel amplification amount and the first right channel amplification amount. The setter sets the first left channel amplification amount so that the first left channel amplification amount and the second left channel amplification amount are cancelled out by each other, and sets the first right channel amplification amount so that the first right channel amplification amount and the second right channel amplification amount are cancelled out by each other.

Thus, an amplification amount for a signal including in the first audio content is cancelled out by the first amplifier 10 and the second amplifier 12. In contrast, an amplification amount for the second audio content can be freely set by the setter. Therefore, for example, when the audio signal processor 100 is installed in a vehicle, and an audio signal, such as voice guidance, warning sound for assisting driving operation of the vehicle is used as the first audio content, it is possible to protect against reduction in the effect of the first audio content, and to freely set the amplification ratio between the right and the left for the second audio content. For example, it is possible to provide music content included in the second audio content to listeners located other than the driver seat 51 with optimal sound volume balance with the warning effect of warning sound on the driver by the first audio content maintained.

In the audio signal processor 100, the second audio content may include the second left channel signal and the second right channel signal, the left channel mixed signal is a signal obtained by mixing the first left channel amplified signal and the second left channel signal, and the right channel mixed signal is a signal obtained by mixing the first right channel amplified signal and the second right channel signal.

Thus, the first left channel signal amplified by the first left channel amplification amount in the first amplifier 10 is mixed in the mixer 11, then is amplified by the second left channel amplification amount in the second amplifier 12. Here, since the setter 14 sets the first left channel amplification amount so that the first left channel amplification amount and the second left channel amplification amount are cancelled out by each other, change in the strength of the first left channel signal in the audio signal processor 100 is reduced. Similarly, change in the strength of the first right channel signal in the audio signal processor 100 is also reduced. Therefore, for example, when the audio signal processor is installed in the vehicle 50, and voice guidance, warning sound or the like for assisting driving operation of the vehicle is used as the first audio content, it is possible to more reliably protect against reduction in the effect of the first audio content.

The audio signal processor 100 may further include the left channel speaker device 13L that outputs a left channel output signal and the right channel speaker device 13R that outputs a right channel output signal, and the setter 14 may set a second left channel amplification amount and a second right channel amplification amount based on the position of a listener of the second audio content.

Consequently, the ratio of the amplification amounts for the right and left signals of the second audio content can be freely set according to the position of a listener of the second audio content. In this case also, protection against reduction in the effect of an audio content is provided.

In the embodiment, an example has been shown, in which the first audio content is pre-processed so that when reproduced by 2ch speaker 13 including the left channel speaker device 13L and the right channel speaker device 13R installed in the vehicle 50, the effect of generating warning sound near an ear of the driver 61 is obtained. However, such pre-processing may not be performed on the first audio content. Specifically, in a state where voice guidance, warning sound or the like are registered (recorded) on an in-vehicle device, the processing for the effect is not performed, and the processing may be performed in a preceding stage of signal input to the first amplifier 10.

Embodiment 2

Next, an audio signal processor according to Embodiment 2 will be described. An audio signal processor according to the embodiment differs from the audio signal processor according to Embodiment 1 in that in addition to the first audio content and the second audio content, the third audio content is further processed, and the first audio content is not amplified or attenuated. Hereinafter, the audio signal processor according to the embodiment will be described focused on the point of difference from the audio signal processor 100 according to Embodiment 1 with reference to the drawings.

[2-1. Overall Configuration]

Figure 4:
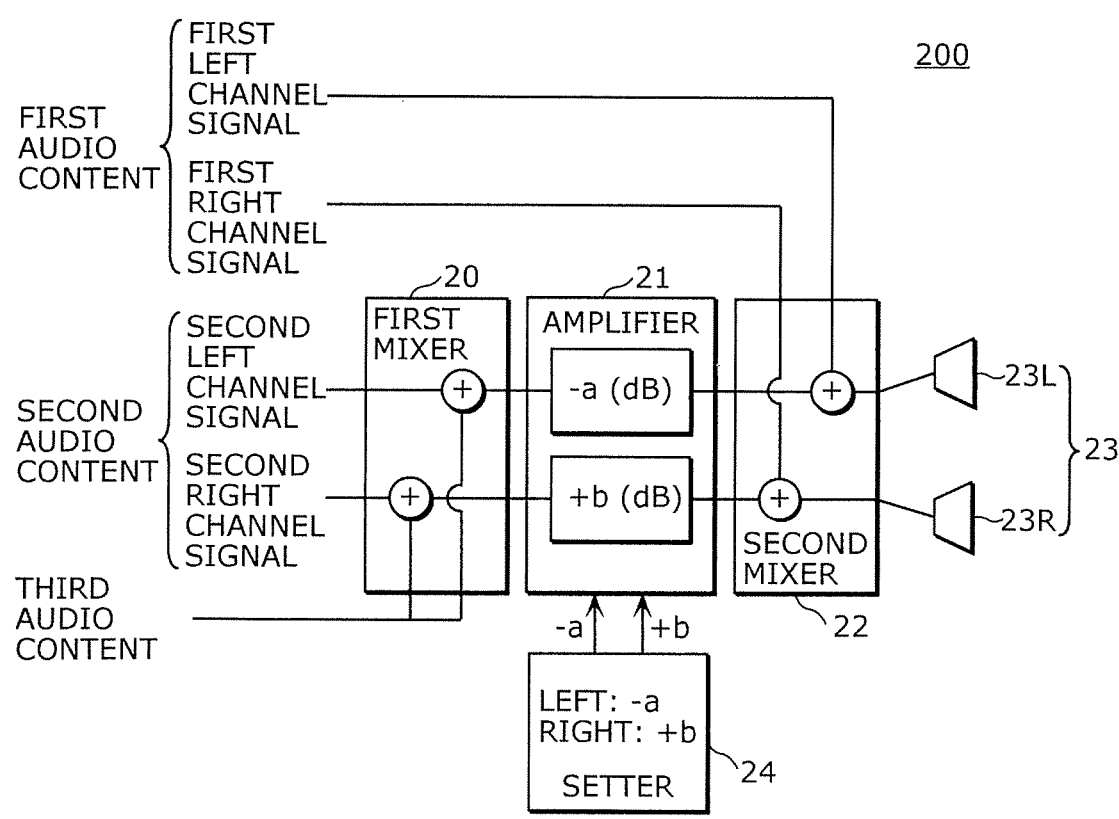
FIG. 4 is a block diagram illustrating the schematic configuration of an audio signal processor according to Embodiment 2.

FIG. 4 is a block diagram illustrating the schematic configuration of an audio signal processor 200 according to the embodiment.

The audio signal processor 200 according to the embodiment is a device that processes the first to third audio contents. The first audio content is a content similar to the first audio content according to Embodiment 1. The second audio content and the third audio content are not particularly limited as long as they are each 1ch or greater audio content. In the embodiment, the second audio content is the primary voice of a broadcast content, and the third audio content is explanatory voice for visually impaired persons. The second audio content includes the second left channel signal and the second right channel signal. The third audio content includes the third signal.

As illustrated in FIG. 4, the audio signal processor 200 according to the embodiment includes a first mixer 20, an amplifier 21, a second mixer 22, and a setter 24. The audio signal processor 200 further includes a speaker 23 including a left channel speaker device 23L and a right channel speaker device 23R.

The first mixer 20 is an audio mixer that mixes the second audio content and the third audio content to output the first left channel mixed signal and the first right channel mixed signal. In the embodiment, the first left channel mixed signal is a signal obtained by mixing the second left channel signal of the second audio content and the third signal of the third audio content. The first right channel mixed signal is a signal obtained by mixing the second right channel signal of the second audio content and the third signal of the third audio content.

The amplifier 21 is an audio amplifier that receives an input of the first left channel mixed signal and the first right channel mixed signal, and outputs a left channel amplified signal generated by amplifying the first left channel mixed signal by a left channel amplification amount and a right channel amplified signal generated by amplifying the first right channel mixed signal by a right channel amplification amount. The amplifier 21 independently amplifies the first left channel mixed signal and the first right channel mixed signal which are output signals of the first mixer 20.

The second mixer 22 is an audio mixer that receives input of the left channel amplified signal and the right channel amplified signal, and the first audio content, and outputs a left channel output signal obtained by mixing the left channel amplified signal and the first left channel signal, and a right channel output signal obtained by mixing the right channel amplified signal and the first right channel signal.

The speaker 23 includes 2ch speakers on the left channel and the right channel connected to the second amplifier 22. The speaker 23 includes the left channel speaker device 23L and the right channel speaker device 23R. The left channel speaker device 23L and the right channel speaker device 23R receives an input of the left channel output signal and the right channel output signal outputted from the second mixer 22, respectively. For example, the left channel speaker device 23L and the right channel speaker device 23R are installed at positions on the left side and the right side as viewed from the driver seat of a vehicle such as an automobile, respectively.

The setter 24 is a processor that sets the left channel amplification amount and the right channel amplification amount of the amplifier 21. In the embodiment, the setter 24 sets the left channel amplification amount and the right channel amplification amount in the second amplifier 21 so that the balance between the sound volumes outputted from the left channel speaker device 23L and the right channel speaker device 23R becomes an optimal at the position of a listener. The setting by the setter 24 of the left channel amplification amount and the right channel amplification amount may be manually performed by a user (for example, a listener), or may be automatically performed by the setter 24.

[2-2. Operation]

Next, the operation of thus configured audio signal processor 200 will be described below.

First, the second audio content and the third audio content are mixed by the first mixer 20.

Next, the first left channel mixed signal and the first right channel mixed signal, which are outputted from the first mixer 20, are each independently amplified by the amplifier 21. The left channel amplification amount and the right channel amplification amount, which are respective amplification amounts on the left and the right then, are set by the setter 24 so that optimal sound volume balance is achieved at the front passenger seat 52 (the position of a listener). In the embodiment, the left channel amplification amount and the right channel amplification amount are set to −a (dB) and +b (dB), respectively.

Next, the output signal of the amplifier 21 and the first audio content are mixed by the second mixer 22.

Finally, the output signal of the second mixer 22 is outputted by the speaker 23.

In the audio signal processor 200 that operates as described above, the balance between amplification amounts for signals on the left channel and right channel of the second and third audio contents can be freely set according to the position of a listener.

Consequently, a listener can perceive the second and third audio contents with an optimal right and left balance. In contrast, the first audio content is outputted via the speaker 23 without being amplified and attenuated, thus protection against reduction in the effect of the first audio content on the driver 61 is provided.

[2-3. Summary]

As described above, the audio signal processor 200 according to the embodiment processes the first audio content, the second audio content, and the third audio content including the first left channel signal and the first right channel signal, respectively, and when the first audio content, the second audio content, and the third audio are reproduced by the left channel speaker device 23L and the right channel speaker device 23R in the vehicle 50, the driver seat 51 of the vehicle 50 becomes a sweet spot. The audio signal processor 200 includes the mixer 20 that outputs the first left channel mixed signal and the first right channel mixed signal which are obtained by mixing the second audio content and the third audio content. The audio signal processor 200 further includes the amplifier 21 that receives an input of the first left channel mixed signal and the first right channel mixed signal, and outputs a left channel amplified signal generated by amplifying the first left channel mixed signal by the left channel amplification amount, and a right channel amplified signal generated by amplifying the first right channel mixed signal by the right channel amplification amount. The audio signal processor 200 further includes the second mixer 22 that receives input of the left channel amplified signal and the right channel amplified signal, and the first audio content, and outputs a left channel output signal obtained by mixing the left channel amplified signal and the first left channel signal, and a right channel output signal obtained by mixing the right channel amplified signal and the first right channel signal. The audio signal processor 200 further includes the setter 24 that sets a left channel amplification amount and a right channel amplification amount.

Consequently, the same effect as that of the audio signal processor 100 according to Embodiment 1 is obtained in the audio signal processor 200. In the embodiment, although two mixers have to be provided, the second and third audio contents, which should be outputted as sound to a listener located at the front passenger seat with an optimal sound volume balance can be outputted as sound with an optimal sound volume balance. In addition, adjustment of the sound volume balance does not affect to the sound volume balance of the first audio content, thus protection against reduction in the effect of calling attention of the driver is provided.

The audio signal processor 200 may further include the left channel speaker device 23L that outputs a left channel output signal, and the right channel speaker device 23R that outputs a right channel output signal, and the setter 24 may set the left channel amplification amount and the right channel amplification amount based on the position of a listener of the second audio content and the third audio content.

Consequently, the ratio of the amplification amounts for the right and left signals of the second audio content can be freely set according to the position of a listener of the second and third audio contents. In this case also, protection against reduction in the effect of an audio content is provided.

Embodiment 3

Next, an audio signal processor according to Embodiment 3 will be described.

The audio signal processor according to the embodiment differs from the audio signal processor 200 according to Embodiment 2 in that the first audio content can be amplified, and the third audio content is not necessarily processed. Hereinafter, the audio signal processor according to the embodiment will be described focused on the point of difference from the audio signal processor 200 according to Embodiment 2 with reference to the drawings.

[3-1. Overall Configuration]

Figure 5:
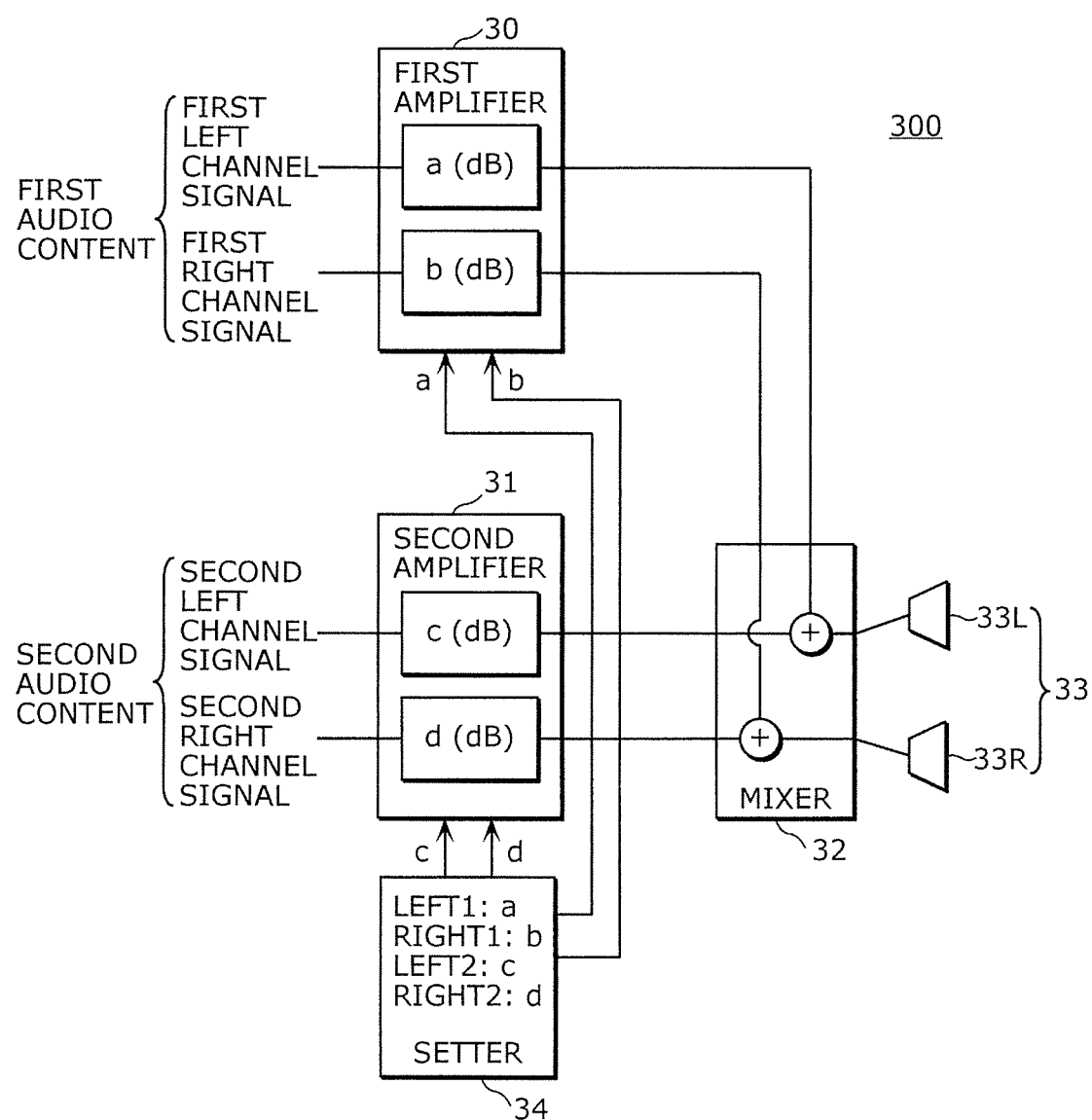
FIG. 5 is a block diagram illustrating the schematic configuration of an audio signal processor according to Embodiment 3.
Figure 6:
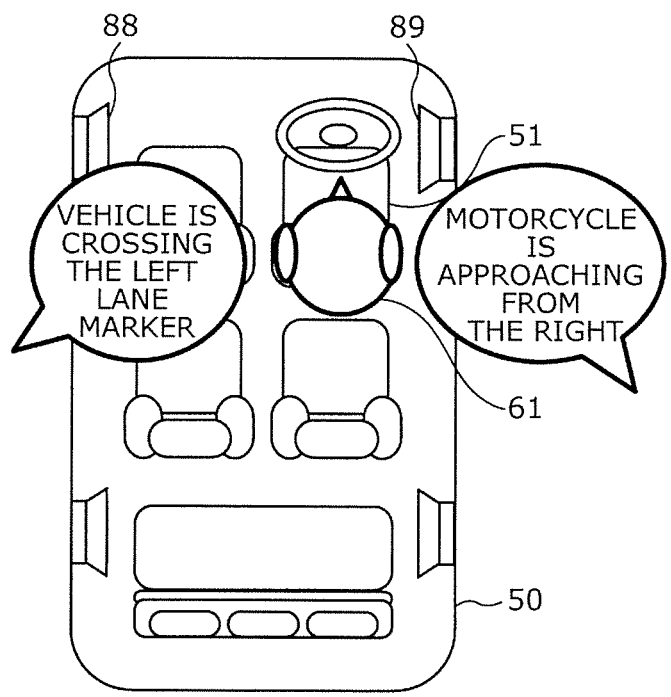
FIG. 6 is an illustration showing a manner in which a message for effectively calling attention is conveyed to a driver in a vehicle.

FIG. 5 is a block diagram illustrating the schematic configuration of an audio signal processor 300 according to the embodiment.

The audio signal processor 300 according to the embodiment is a device that processes the first and second audio contents. The first and second audio contents are contents similar to the first and second audio contents according to Embodiment 1.

As illustrated in FIG. 5, the audio signal processor 300 according to the embodiment includes a first amplifier 30, a second amplifier 31, a mixer 32, and a setter 34. The audio signal processor 300 further includes a speaker 33 including a left channel speaker device 33L and a right channel speaker device 33R.

The first amplifier 30 is an audio amplifier that receives an input of the first left channel signal and the first right channel signal of the first audio content, and outputs a first left channel amplified signal generated by amplifying the first left channel signal by the first left channel amplification amount, and a first right channel amplified signal generated by amplifying the first right channel signal by the first right channel amplification amount. In the embodiment, the first amplifier 30 can independently amplify the first left channel signal and the first right channel signal of the first audio content. It is to be noted that the first amplifier 30 may amplify the first left channel signal and the first right channel signal by the same amplification amount.

The second amplifier 31 is an audio amplifier that receives an input of the second left channel signal and the second right channel signal of the second audio content, and outputs a second left channel amplified signal generated by amplifying the second left channel signal by the second left channel amplification amount, and a second right channel amplified signal generated by amplifying the second right channel signal by the second right channel amplification amount. In the embodiment, the second amplifier 31 can independently amplify the second left channel signal and the second right channel signal of the first audio content. It is to be noted that the second amplifier 31 may amplify the second left channel signal and the second right channel signal by the same amplification amount.

The mixer 32 is an audio mixer that mixes the output signal of the first amplifier 30 and the output signal of the second amplifier 31 to output a left channel output signal and a right channel output signal. In other words, the mixer 32 outputs a left channel output signal obtained by mixing the first left channel amplified signal and the second left channel amplified signal, and a right channel output signal obtained by mixing the first right channel amplified signal and the second right channel amplified signal.

The speaker 33 includes 2ch speakers on the left channel and the right channel connected to the mixer 32. The speaker 33 includes the left channel speaker device 33L and the right channel speaker device 33R. The left channel speaker device 33L and the right channel speaker device 33R receive an input of the left channel output signal and the right channel output signal outputted from the mixer 32, respectively. For example, the left channel speaker device 33L and the right channel speaker device 33R are installed at positions on the left side and the right side as viewed from the driver seat of a vehicle such as an automobile, respectively.

The setter 34 is a processor that sets the first left channel amplification amount and the first right channel amplification amount of the first amplifier 30, and the second left channel amplification amount and the second right channel amplification amount of the second amplifier 31. In the embodiment, the setter 34 sets the first left channel amplification amount to a value smaller than the second left channel amplification amount, and sets the first right channel amplification amount to a value smaller than the second right channel amplification amount. Also, the setter 34 may set the second left channel amplification amount and the second right channel amplification amount so that the balance between the sound volumes outputted from the left channel speaker device 33L and the right channel speaker device 33R becomes an optimal at the position of a listener. The setting by the setter 34 of the second left channel amplification amount and the second right channel amplification amount may be manually performed by a user (for example, a listener), or may be automatically performed by the setter 34.

[3-2. Operation]

Next, the operation of thus configured audio signal processor 300 will be described below.

First, the second audio content is amplified by the second amplifier 31. The second left channel amplification amount and the second right channel amplification amount, which are respective amplification amounts on the left and the right then, are set by the setter 34 so that optimal sound volume balance is achieved at the front passenger seat 52 (the position of a listener). In the embodiment, the second left channel amplification amount and the second right channel amplification amount are set to c (dB) and d (dB), respectively.

Subsequently, the first audio content is amplified by the first amplifier 30. The first left channel amplification amount and the second right channel amplification amount, which are respective amplification amounts on the left and the right then, are set by the setter 34. In the embodiment, the setter 34 sets the first left channel amplification amount to a value smaller than the second left channel amplification amount, and sets the first right channel amplification amount to a value smaller than the second right channel amplification amount. In other words, let the first left channel amplification amount and the first right channel amplification amount be a (dB) and b (dB), then the setter 34 sets the first left channel amplification amount and the first right channel amplification amount so that a<c and b<d are met.

Next, the output signal of the first amplifier 30 and the output signal of the second amplifier 31 are mixed in the mixer 32.

Finally, the output signal of the mixer 32 is outputted by the speaker 33.

In the audio signal processor 300 that operates as described above, the balance between amplification amounts for signals on the left channel and right channel of the second audio content can be freely set according to the position of a listener. Consequently, a listener can perceive the second and third audio contents with an optimal right and left balance. In contrast, the first audio content is amplified by an amplification amount smaller than that of the second audio content, then is outputted by the speaker 33. Thus, the effect of the audio signal processor 300 on the first audio content is reduced. Therefore, for example, when the audio signal processor 300 is installed in a vehicle, and an audio signal, such as voice guidance, warning sound for assisting driving operation of the vehicle is used as the first audio content, it is possible to protect against reduction in the effect of the first audio content, and to freely set the amplification ratio between the right and the left for the second audio content.

[3-3. Summary]

As described above, the audio signal processor 300 according to the embodiment processes the first audio content including the first left channel signal and the first right channel signal, and the second audio content including the second left channel signal and the second right channel signal. The audio signal processor 300 includes the first amplifier 30 that receives an input of the first left channel signal and the first right channel signal, and outputs a first left channel amplified signal generated by amplifying the first left channel signal by the first left channel amplification amount, and a first right channel amplified signal generated by amplifying the first right channel signal by the first right channel amplification amount. The audio signal processor 300 further includes the second amplifier 31 that receives an input of the second left channel signal and the second right channel signal, and outputs a second left channel amplified signal generated by amplifying the second left channel signal by the second left channel amplification amount, and a second right channel amplified signal generated by amplifying the second right channel signal by the second right channel amplification amount. The audio signal processor 300 further includes the mixer 32 that outputs a left channel output signal obtained by mixing the first left channel amplified signal and the second left channel amplified signal, and a right channel output signal obtained by mixing the first right channel amplified signal and the second right channel amplified signal. The audio signal processor 300 further includes the setter 34 that sets the first left channel amplification amount and the first right channel amplification amount, and the second left channel amplification amount and the second right channel amplification amount.

The setter 34 sets the first left channel amplification amount to a value smaller than the second left channel amplification amount, and sets the first right channel amplification amount to a value smaller than the second right channel amplification amount.

Therefore, the amplification amount for the signal included in the first audio content is smaller than the amplification amount for the signal included in the second audio content. Therefore, for example, when the audio signal processor is installed in a vehicle, and a signal representing voice guidance, warning sound or the like for assisting, for example, driving operation of the vehicle is used as the first audio content, it is possible to protect against reduction in the effect of the first audio content, and to freely set the amplification amount for the signal included in the second audio content.

OTHER EMBODIMENTS

As shown above, Embodiments 1 to 3 have been described as an illustration of the technique disclosed in the present application. However, the technique in the present disclosure is not limited to this, and is also applicable to an embodiment, to which modifications, substitutions, additions, and omissions are made. It is also possible to create a new embodiment by combining components described in Embodiments 1 to 3.

It should be noted that general or specific embodiments may be implemented as a system, a method, an integrated circuit, a computer program, a storage medium such as a computer-readable CD-ROM, or any selective combination thereof.

For example, the components (such as the setter 14) included in the audio signal processor 100 according to Embodiment 1 of the present disclosure may be implemented by software such as a program executed on a computer, or may be implemented by hardware such as an electronic circuit, the computer including a central processing unit (CPU), a random access memory (RAM), a ROM, a communication interface, an I/O Port, a hard disk, and a display.

In the above-mentioned embodiments, each component may be formed of dedicated hardware, or may be implemented by executing a software program suitable to the component. Each component may be implemented by a program executor, such as a CPU or a processor, reading and executing a software program which is recorded on a recording medium such as a hard disk or a semiconductor memory.

As shown above, embodiments have been described as an illustration of the technique in the present disclosure. Thus, the accompanying drawings and detailed description have been provided.

It should be noted that the components described in the accompanying drawings and detailed description may include not only the components necessary for solving the problem, but also the components unnecessary for solving the problem in order to illustrate the technique. Therefore, it is to be understood that those unnecessary components should not be recognized as necessary components just because the unnecessary components are described in the accompanying drawings and detailed description.

Because the above-described embodiments are provided for the purpose of illustrating the technique in the present disclosure, various modifications, replacements, additions, and omissions may be made in the scope of claims and equivalent thereof.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The audio signal processor according to the present disclosure increases the effect of warning sound on calling attention of the driver, and provides a listener other than the driver with music and television contents with an optimal sound volume balance, thus is applicable to an in-vehicle audio device.

The invention claimed is:

1. An audio signal processor configured to process a first audio content including a first left channel signal and a first right channel signal, and a second audio content, the first audio content being processed so that when the first audio content is reproduced in a vehicle by a left channel speaker device and a right channel speaker device, a driver seat of the vehicle becomes a sweet spot, the audio signal processor comprising:
   a first amplifier configured to receive an input of the first left channel signal and the first right channel signal, and outputs a first left channel amplified signal generated by amplifying the first left channel signal by a first left channel amplification amount, and a first right channel amplified signal generated by amplifying the first right channel signal by a first right channel amplification amount;
   a mixer configured to output a left channel mixed signal and a right channel mixed signal which are obtained by mixing the first left channel amplified signal and the first right channel amplified signal with the second audio content;
   a second amplifier configured to receive an input of the left channel mixed signal and the right channel mixed signal, and configured to output a left channel output signal generated by amplifying the left channel mixed signal by a second left channel amplification amount, and a right channel output signal generated by amplifying the right channel mixed signal by a second right channel amplification amount; and
   a setter configured to set the first left channel amplification amount and the first right channel amplification amount,
   wherein the setter is configured to set the first left channel amplification amount so that the first left channel amplification amount and the second left channel amplification amount are cancelled out by each other, and is configured to set the first right channel amplification amount so that the first right channel amplification amount and the second right channel amplification amount are cancelled out by each other.

2. The audio signal processor according to claim 1, wherein the second audio content includes a second left channel signal and a second right channel signal,
   the left channel mixed signal is a signal obtained by mixing the first left channel amplified signal and the second left channel signal, and
   the right channel mixed signal is a signal obtained by mixing the first right channel amplified signal and the second right channel signal.

3. The audio signal processor according to claim 1, further comprising:
   the left channel speaker device configured to output the left channel output signal, and the right channel speaker device configured to output the right channel output signal,
   wherein the setter is configured to set the second left channel amplification amount and the second right channel amplification amount based on a position of a listener of the second audio content.

* * * * *